US007628433B2

(12) United States Patent
Schwartz

(10) Patent No.: US 7,628,433 B2
(45) Date of Patent: Dec. 8, 2009

(54) CRUCIBLE HOLDER

(75) Inventor: Arnold Schwartz, Crompond, NY (US)

(73) Assignee: Global Market Connections LtdNY (US)

( * ) Notice: Subject to any disclaimer, the term of this patent is extended or adjusted under 35 U.S.C. 154(b) by 310 days.

(21) Appl. No.: 11/097,614

(22) Filed: Mar. 30, 2005

(65) Prior Publication Data

US 2006/0220401 A1 Oct. 5, 2006

(51) Int. Cl.
*B25J 1/12* (2006.01)

(52) U.S. Cl. .................................................... 294/27.1

(58) Field of Classification Search ................ 294/27.1, 294/33, 90, 91
See application file for complete search history.

(56) References Cited

U.S. PATENT DOCUMENTS 312,642 A * 2/1885 Jones .......................... 294/28
546,081 A * 9/1895 Reyer .......................... 248/558
1,067,993 A * 7/1913 Lewis .......................... 269/233
1,180,119 A * 4/1916 Ericson ........................ 294/33
1,213,743 A * 1/1917 Carson ........................ 248/94
1,264,917 A * 5/1918 Green .......................... 248/94
1,341,371 A * 5/1920 Kilian .......................... 294/33
1,749,753 A * 3/1930 Cauffield .................... 294/19.1
2,001,346 A * 5/1935 Hays ............................ 294/28
3,219,375 A * 11/1965 Van Pelt ..................... 294/99.2
6,012,210 A * 1/2000 Stadjuhar et al. ........... 29/281.5

OTHER PUBLICATIONS

Bunsen Burners and Accessaries' Burner Tripod.*
Crucible Tongs—http://www.litcompx.com/images7/new055.jpg.
Crucible Holder—http://sargentwelch.com/prdocutasp_Q_pn_E_WLS24475_EA.
Stoddard Clamp—http://sargentwelch.com/product.asp_Q_pn_E_WLS19555%5FEA_A_Test+Tube+Clamps+%28Stoddard+Clamp%29_E_.
Stoddard Clamp with Finger Grips—http://sargentwelch.com/product.asp_Q_pn_E_WLS19575%2DA%5FEA_A_Test+Tube+Clamp+with+Finger+Grips+28Stoddard+Clamp%29_E_.
Base Support with Extension Rings—http://sargentwelch.com/product.asp?pn=WLS78370_EA&ss=base%20support%20extension.
Triangle—http://www.enasco.com/prod/ProductDetail?sku=SA04428M&title=.

* cited by examiner

*Primary Examiner*—Paul T Chin
(74) *Attorney, Agent, or Firm*—Marc E. Hankin; Kevin E. Schraven; Hankin Patent Law, APC

(57) ABSTRACT

A labware handling device comprising an opening for supporting or suspending a crucible or other piece of labware, three or more legs, and a handle to allow the user to easily manipulate and move the labware handling device.

2 Claims, 9 Drawing Sheets

CRUCIBLE HOLDER

FIELD OF INVENTION

This invention relates, generally, to vessel holders; more particularly to vessel holders that are suited to handle hot or hazardous labware, such as crucibles, that have been heated over a hot plate, gas hot plate, open flame, or other laboratory heating apparatus.

BACKGROUND

Every high school science teacher or laboratory technician who has spent an appreciable amount of time in a laboratory has undoubtedly heard the cacophonic crash of crucibles, test tubes, and other laboratory glassware being dropped and shattered. Oftentimes, these accidents occur because the art has not yet developed a device for safely handling hot hazardous objects, such as crucibles, flasks, and test tubes; securely standing them in place; and allowing them to be safely placed over a hot plate, gas hot plate, open flame, or other laboratory heating apparatus.

The current state of the art is to use crucible tongs, the common device for handling crucibles, in a laboratory. Crucible tongs, which operate in the same manner as common tongs, feature pincer shaped, curved levers at the distal end of the tong, which are designed to more securely handle the crucible. Because the tongs commonly are made from steel, and crucibles commonly are made from ceramic, which are both smooth, low-friction materials, the crucible is susceptible to slipping through the tongs, falling, and breaking.

A variety of tongs have been developed to better handle crucibles. One configuration, for example, uses a piece of plastic or rubber at the distal end of the tongs in order to allow a better friction grip of the crucible. The additional rubber and plastic can lead to complications, however, because the high heat content of heated crucibles can burn the rubber or plastic and contaminate the reactants. Also, the rubber or plastic can become otherwise worn by repeated use in the laboratory. And, of course, the material kept in the crucible may corrode the rubber or plastic. Further, because one needs to squeeze the tongs in order to apply pressure to the crucible while, simultaneously, moving one's arm in order to move the crucible, the use of these tongs requires a relatively substantial degree of dexterity, so as not to drop or crush the crucible.

Another device, commonly referred to as a "test tube clamp" or "Stoddard Clamp" operates on the same principle as a tong, with the added feature of a spring mechanism. The spring serves to ease operation by applying pressure to hold the test tube or flask as it is carried by the user, thus demanding less manual dexterity. These Stoddard Clamps, however, are limited because, while they function to carry test tubes and flasks, they are not well suited to handling crucibles, which often must be tilted on their side in use. Further, they cannot be used to stand the labware on a flat surface, in or over a flame, or above another heating apparatus.

Another device that can be used to support test tubes and crucibles is commonly referred to as a support stand and ring. These devices consist, generally, of a high-mass base, a pole, and a ring or clamp for holding the test tube, flask, or crucible that can be slid up and down the pole. While these devices provide a secure means of supporting a test tube, flask, or crucible, the movement is limited to up and down the pole. Thus, these devices are not well suited to handling test tubes and crucibles while moving them around the laboratory.

Another device that can be used to carry crucibles, but not to stand them up, is commonly referred to as a triangle. This device consists of a triangle shape made from twisted wire with three sides that are each encased in a clay pipe sleeve. While the triangle provides a suitable means for standing crucibles on a ring stand, it has several shortcomings. First, because it does not have vertical legs, it cannot be used to stand the crucibles on a flat surface. Thus, it must always be used in conjunction with a ring stand or other such stand. Second, the triangle is susceptible to falling off of the ring stand because it lacks a safety mechanism to prevent it from slipping or being knocked off of the ring stand. Third, the triangle lacks an insulated handle or any other suitable means for carrying the crucible. Thus, the triangle is difficult to handle and can easily be dropped, resulting in possible loss of the reactants, damage to the crucible, and the user's exposure to dangerous materials. A triangle simply does not perform the tasks needed.

Thus, there has been a long felt need in the art for a device that can securely support a crucible, test tube, or flask, be easily and safely handled by the user, and will allow the crucible, test tube, or flask to be safely supported on a flat surface, over a flame, or other laboratory heating apparatus.

SUMMARY OF THE INVENTION

This invention is directed towards overcoming the above shortcomings by providing a stable and secure support for crucibles, test tubes, flasks, and other labware that can easily and safely be handled by the user and can support the labware on a flat surface, as well as over a flame or other laboratory heating apparatus.

Generally speaking, the Crucible Holder consists of three or more legs, for standing the device on a flat surface, a triangular opening with insulated sides, for supporting labware, and an insulated handle, which allows the user to hold the Crucible Holder without the risk of being burned. The Crucible Holder can be manufactured in different shapes in order to accommodate different types of labware and/or for heating over different burners, hot plates, gas hot plates, or other laboratory heating equipment. In one embodiment of the invention, a single Crucible Holder can be adapted to support different shaped labware by altering the shape of the opening in the Crucible Holder by configuring the length of the metal from which the triangle and legs are formed.

A variety of materials can be used to manufacture the Crucible Holder. In one embodiment, that allows for inexpensive manufacture, the legs and body of the Crucible Holder can be made from thin, rust-resistant metal. The sides of the Crucible Holder preferably are made from ceramic or porcelain, which provide thermal insulation for carrying hot glassware. The handle is made from an insulated material, which allows for comfortable gripping, thermal insulation, and durability.

In another embodiment of the invention, the Crucible Holder is generally triangular in shape and configured to hold common-sized laboratory crucibles. In this embodiment, three metal legs are used that are shaped such that they can stand on a flat surface, fit over a common-sized laboratory ring-stand, or stand on a laboratory hot plate. When supported on a ring stand, the legs of the crucible holder serve to protect the crucible holder from accidental displacement from the ring stand by surrounding the ring. The crucible is supported upon three horizontal ceramic rods that form a triangle shaped opening. The legs extend downwards roughly at right angles to the frame from each corner of the triangle and the handle extends roughly horizontally outwards from one corner of the triangle.

In another embodiment of the invention, the Crucible Holder is configured to be used with conventional laboratory triangles to improve their ease of handling and safety. In this embodiment, the device consists of a triangular shaped frame with three legs extending downwards from each corner of the triangle. A thermally insulated handle extends roughly horizontally outwards from one edge of the triangle and allows for safe and easy maneuver of the device. The triangle is held by three supports which are at the top of the Crucible Holder and located at each corner of the triangle. The supports feature a protrusion that extends upwards and prevents the triangle from accidentally slipping off of the device. The supports are constructed to slide inwards and outwards towards and away from the center of the triangle in order to allow triangles of various sizes to be used with the device.

One embodiment of the invention is a labware holder, comprising a ring, the ring being generally circular in shape and featuring three trimetrically opposed groove shaped divots, and three legs on its underside. Such a labware holder with the groove shaped divots being shaped, positioned, and configured to removably hold a standard laboratory triangle; the legs, being configured as to stand the labware holder on a horizontal surface. Such a labware holder further comprising a stem, with the stem connecting the ring to a handle that extends horizontally outwards from the ring and being configured to facilitate ease of handling of the labware holder. Such a labware holder wherein the legs are re-attachable to the labware holder and the labware holder features multiple attachments locations at varying distances from the center of the ring in order to attach the legs to the labware holder.

Another embodiment of the invention is a labware holder, comprising, a ring, that is generally circular in shape and featuring three trimetrically opposed groove shaped divots, and three legs on its underside. Such a labware holder with the groove shaped divots being shaped, positioned, and configured to removably hold a standard laboratory triangle. Such a labware holder with the legs, being configured as to stand the labware holder on a horizontal surface. Such a labware holder wherein the legs are re-attachable to the labware holder and the labware holder features multiple attachments locations at varying distances from the center of the ring in order to attach the legs to the labware holder.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without many of these specific details. In other instances, well-known methods, procedures, and/or components have not been described in detail so as not to unnecessarily obscure novel aspects of the various embodiments of the invention.

In the following description, certain terminology is used to describe certain features of one or more embodiments of the invention. For instance, “crucible” is used to refer to any of a number of pieces of labware, including crucibles, test tubes, flasks, and the like.

Figure 1A:
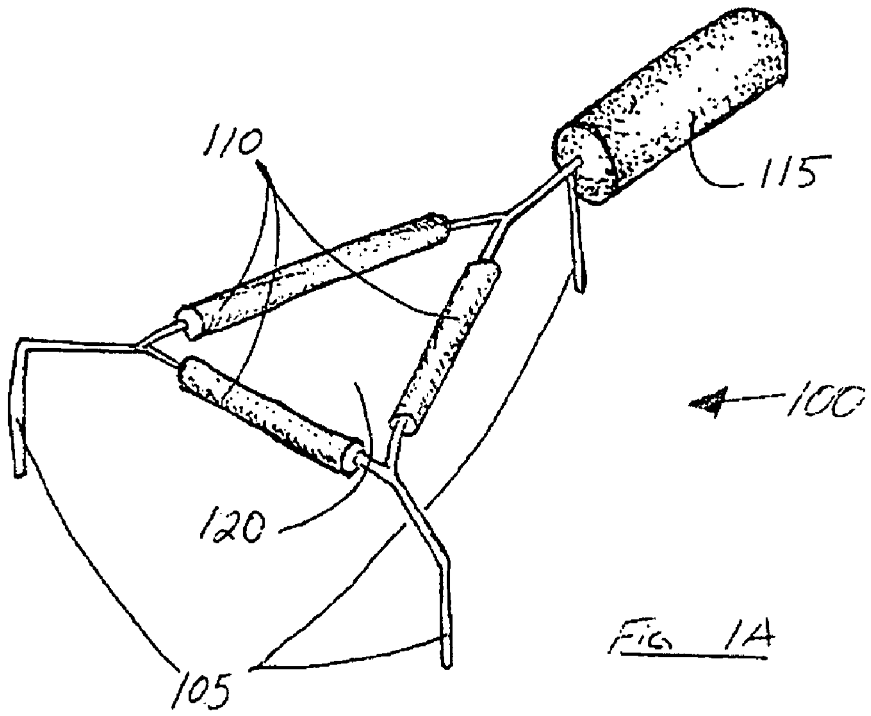
FIG. 1A is an illustration in perspective view of one embodiment of the invention.

FIG. 1A is an illustration in perspective view of one embodiment of the invention. A crucible holder 100 is shown along with its constituent parts, namely, the three legs 105 on which it stands, the ceramic rods 110 that serve to hold the crucible and insulate the crucible holder 100 from heat, and the handle 115, which allows the crucible holder to be securely held in the user’s hand while also providing thermal insulation. A triangular space 120 between the ceramic rods provides a space into which the crucible is placed for holding during heating.

Figure 1B:
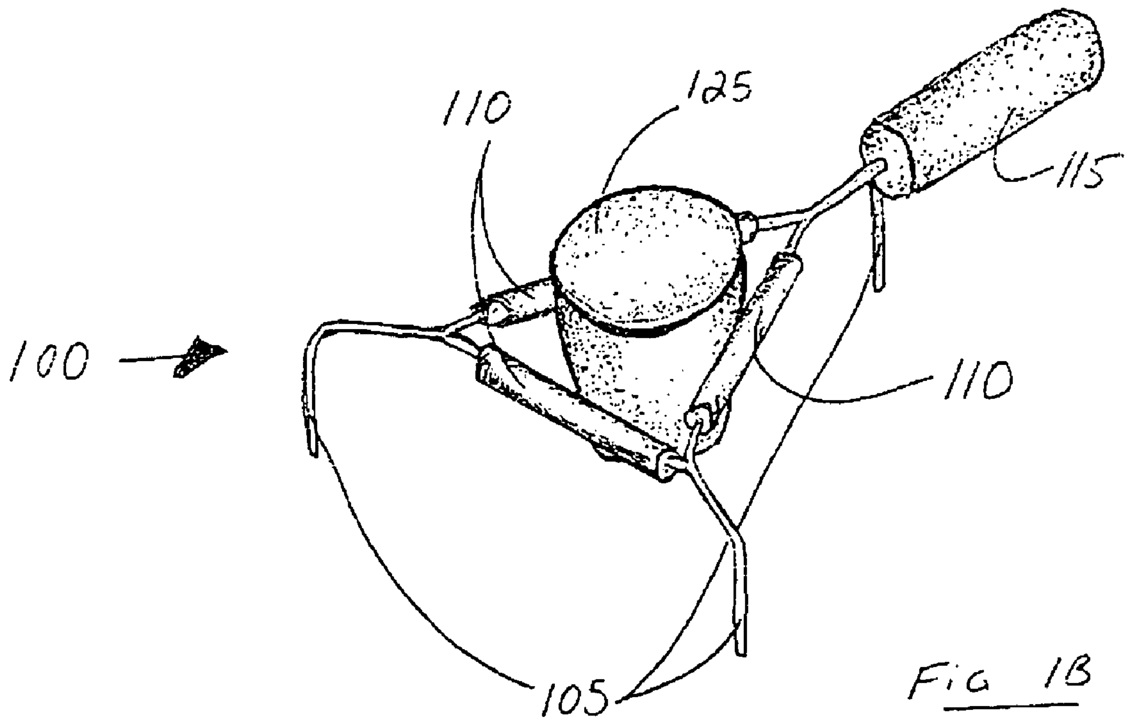
FIG. 1B is an illustration in perspective view of one embodiment of the invention while holding a crucible.

FIG. 1B is an illustration in perspective view of one embodiment of the invention while holding a crucible. A crucible holder 100 is shown along with its constituent parts, namely, the three legs 105 on which it stands, the ceramic rods 110 that serve to hold the crucible and insulate the crucible holder 100 from heat, and the handle 115, which allows the crucible holder to be securely held in the user’s hand while also providing thermal insulation. A crucible 125 is shown being held by the crucible holder 105 and supported by the ceramic rods 110.

Figure 2:
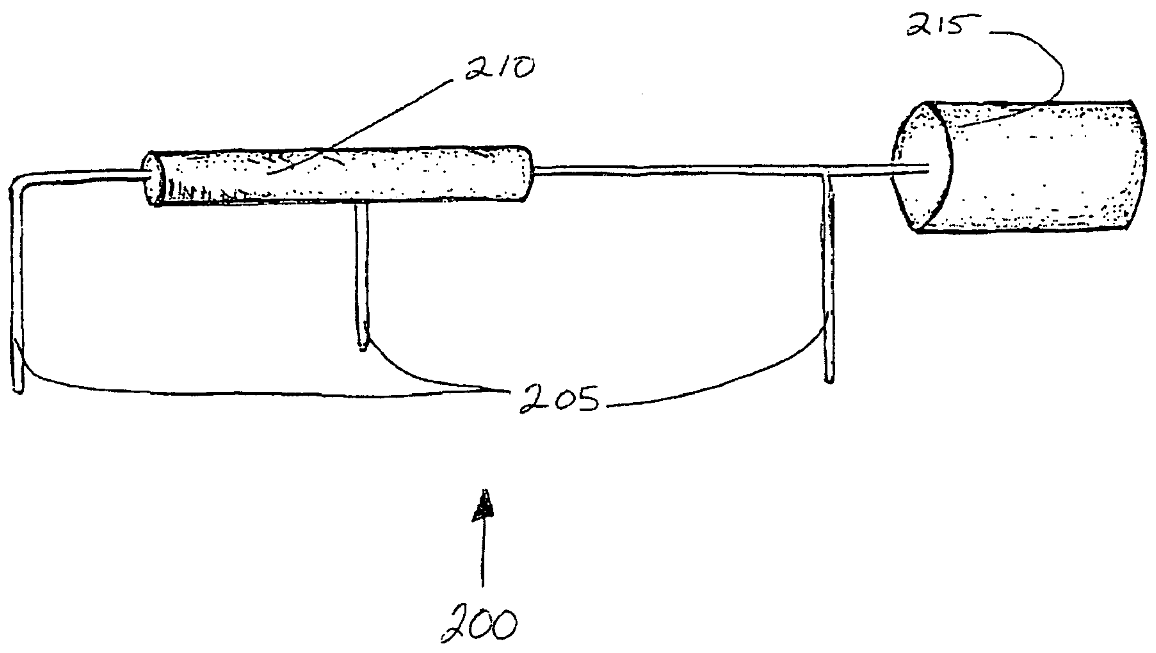
FIG. 2 is an illustration from a side-view of one embodiment of the invention.

FIG. 2 is an illustration from a side-view of one embodiment of the invention. A crucible holder 200 is shown along with its constituent parts, namely, the three legs 205 on which it stands, the ceramic rods 210 that serve to hold the crucible and insulate the crucible holder 200 from heat, and the handle 215, which allows the crucible holder to be securely held in the user’s hand while also providing thermal insulation.

Figure 3:
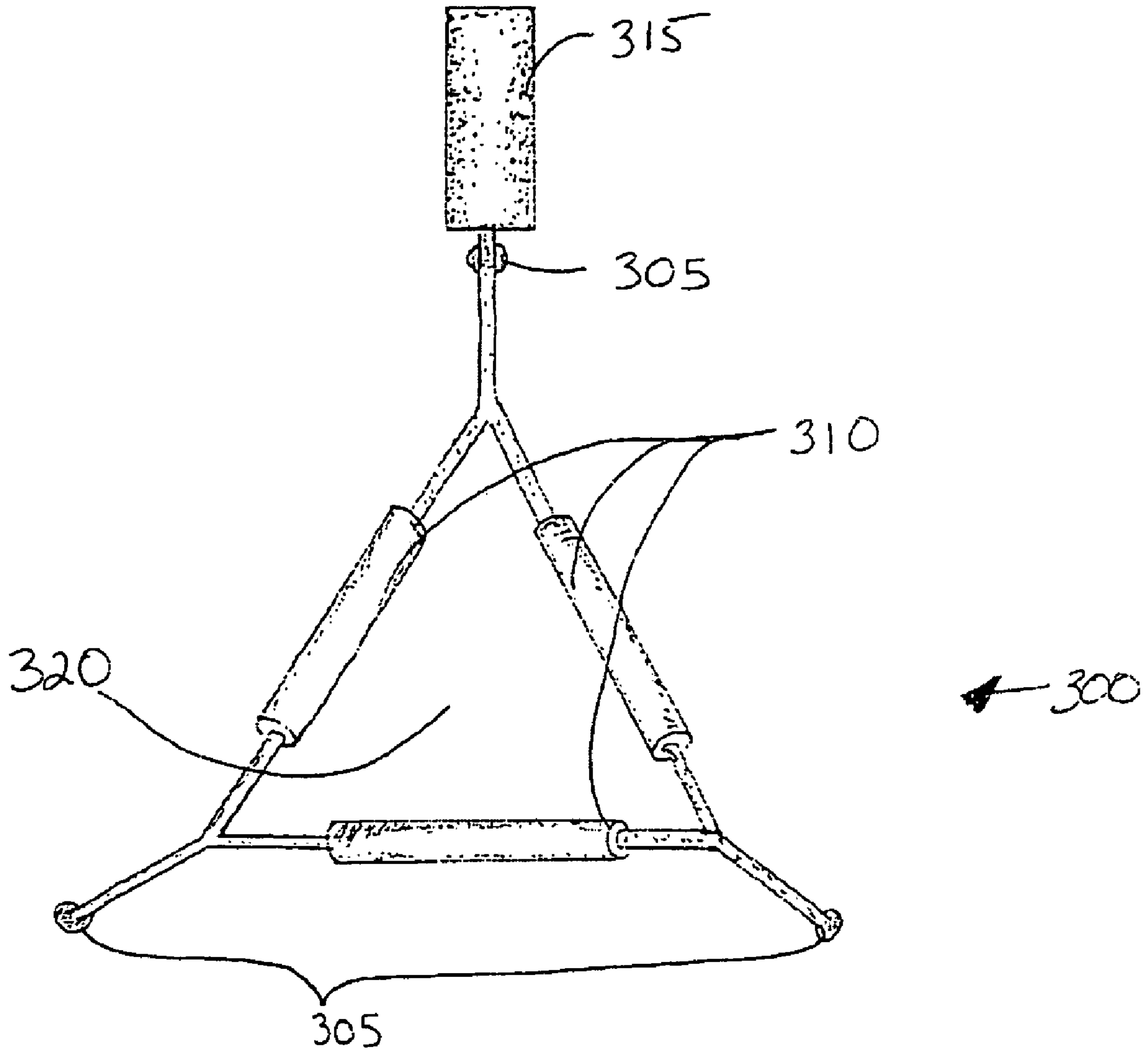
FIG. 3 is an illustration from a top-view of one embodiment of the invention.

FIG. 3 is an illustration from a top-view of one embodiment of the invention. A crucible holder 300 is shown along with its constituent parts, namely, the three legs 305 on which it stands, the ceramic rods 310 that serve to hold the crucible and insulate the crucible holder 300 from heat, and the handle 315, which allows the crucible holder to be securely held in the user’s hand while also providing thermal insulation. A triangular space 320 between the ceramic rods provides a space into which the crucible is placed for holding during heating.

Figure 4:
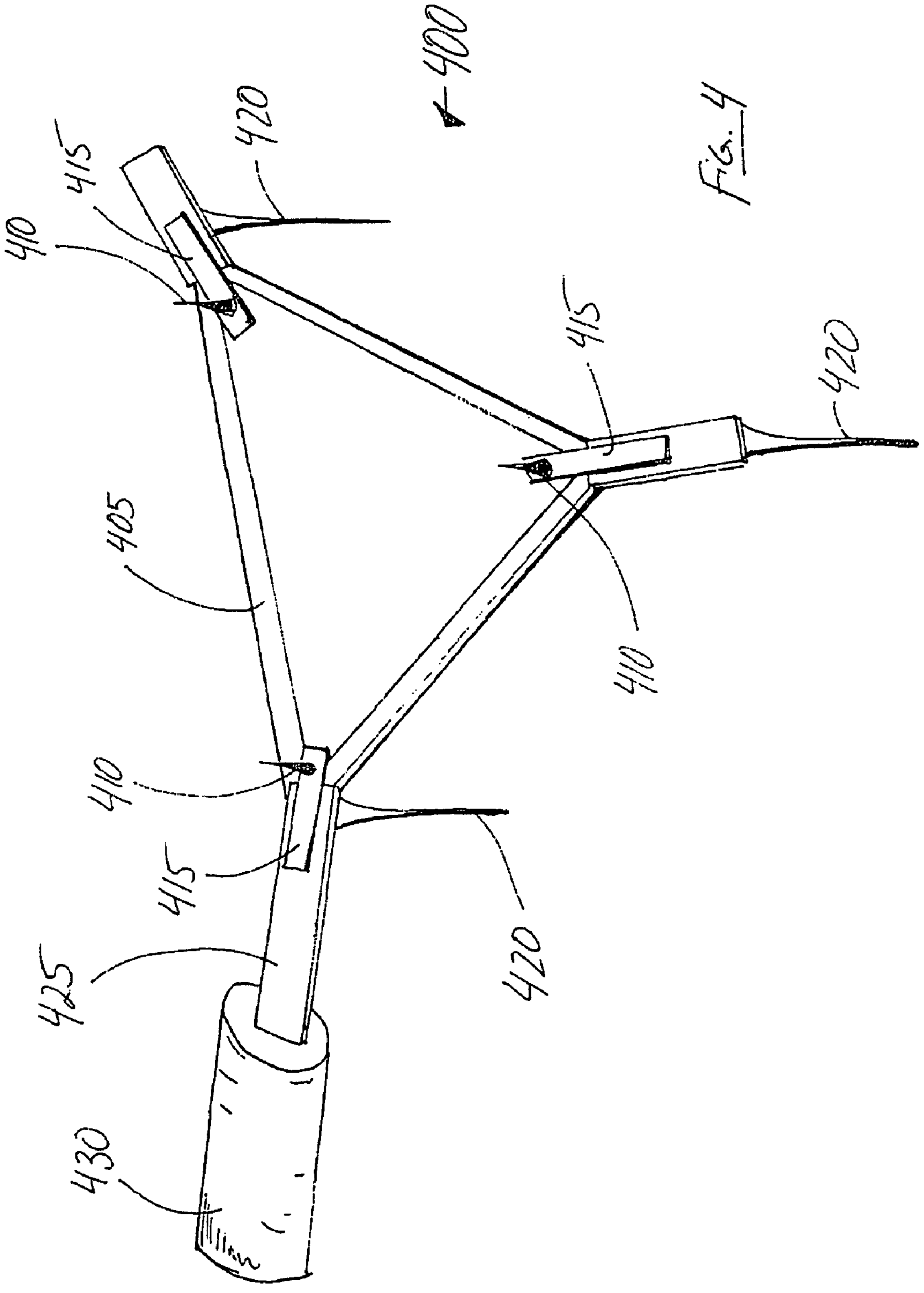
FIG. 4 is an illustration in perspective view of one embodiment of the invention.

FIG. 4 is an illustration in perspective view of one embodiment of the invention. A crucible holder 400 is shown along with its constituent parts, namely, the frame 405, the protrusions 410 which serve to retain a laboratory triangle placed on the crucible holder, the support platforms 415 that are slidable towards and away from the center of the frame, the legs 420, the handle extension 425, and the insulated handle 430.

Figure 5:
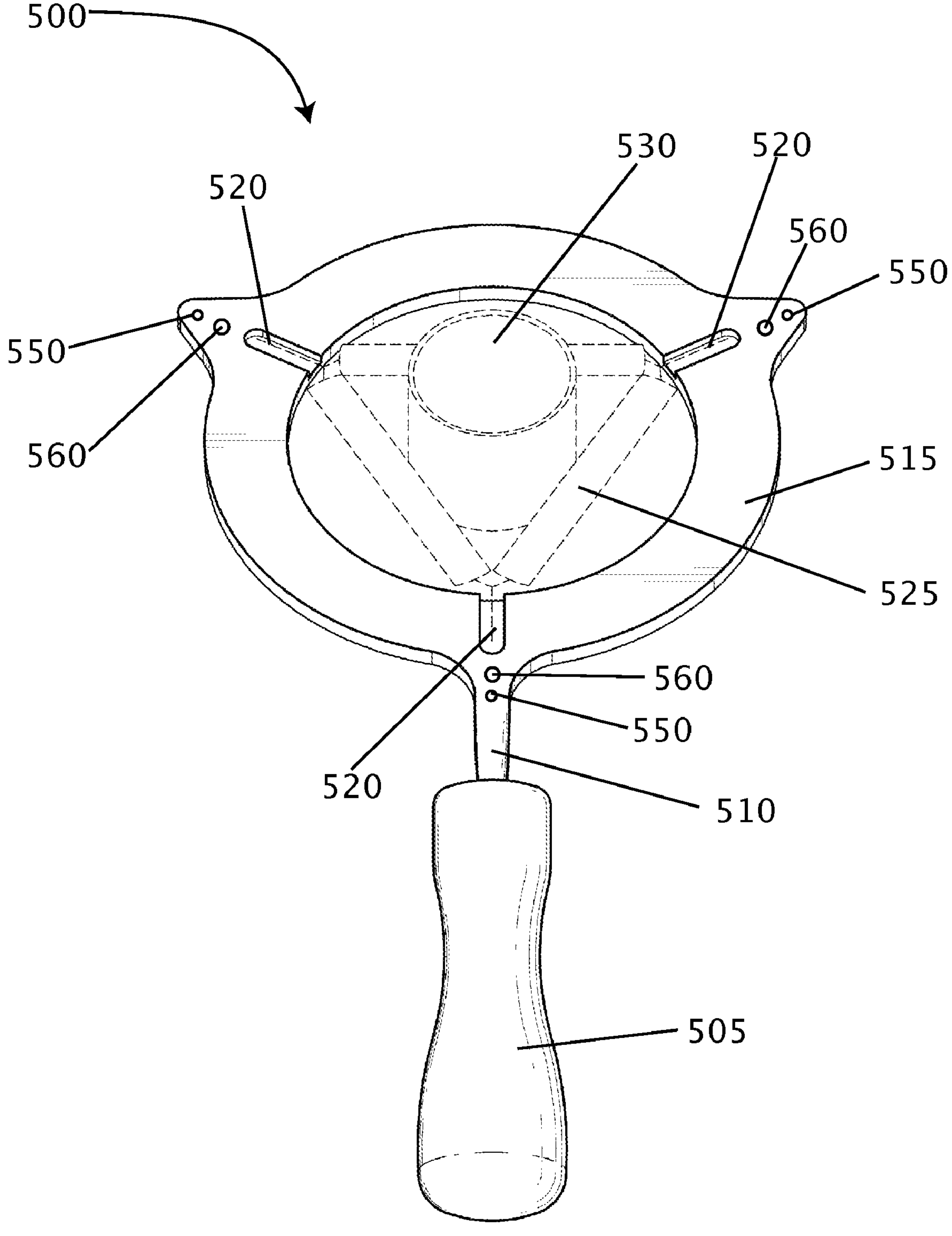
FIG. 5 is an illustration in perspective view of another embodiment of the present invention.

FIG. 5 is an illustration in perspective view of another embodiment of the present invention. A crucible holder 500 is shown while carrying a laboratory triangle 525 that holds a laboratory crucible 530. The constituent parts of the crucible holder 500 are shown, namely a handle 505, a neck 510, a ring 515, and groove shaped divots 520 for holding the laboratory triangle 525. The groove shaped divots 520 serve to securely hold the laboratory triangle 520 for transporting, placement on a scale, over a bunsen burner, or similar such laboratory uses. The crucible holder also includes three legs on its underside, which are not shown from this perspective of the figure. As shown in FIG. 5, the legs of crucible holder 500 can attach to ring 515 at outer holes 550 or inner holes 560, depending on what the crucible holder is carrying, engaging, or resting on. Preferably outer holes 550 and inner holes 560 completely perforate ring 515. However, the holes can be incomplete holes or cylindrical divots on either or both sides of ring 515 without deviating from the scope of the invention. Preferably outer holes 550 and inner holes 560 are smooth, but they can be threaded.

Figure 6:
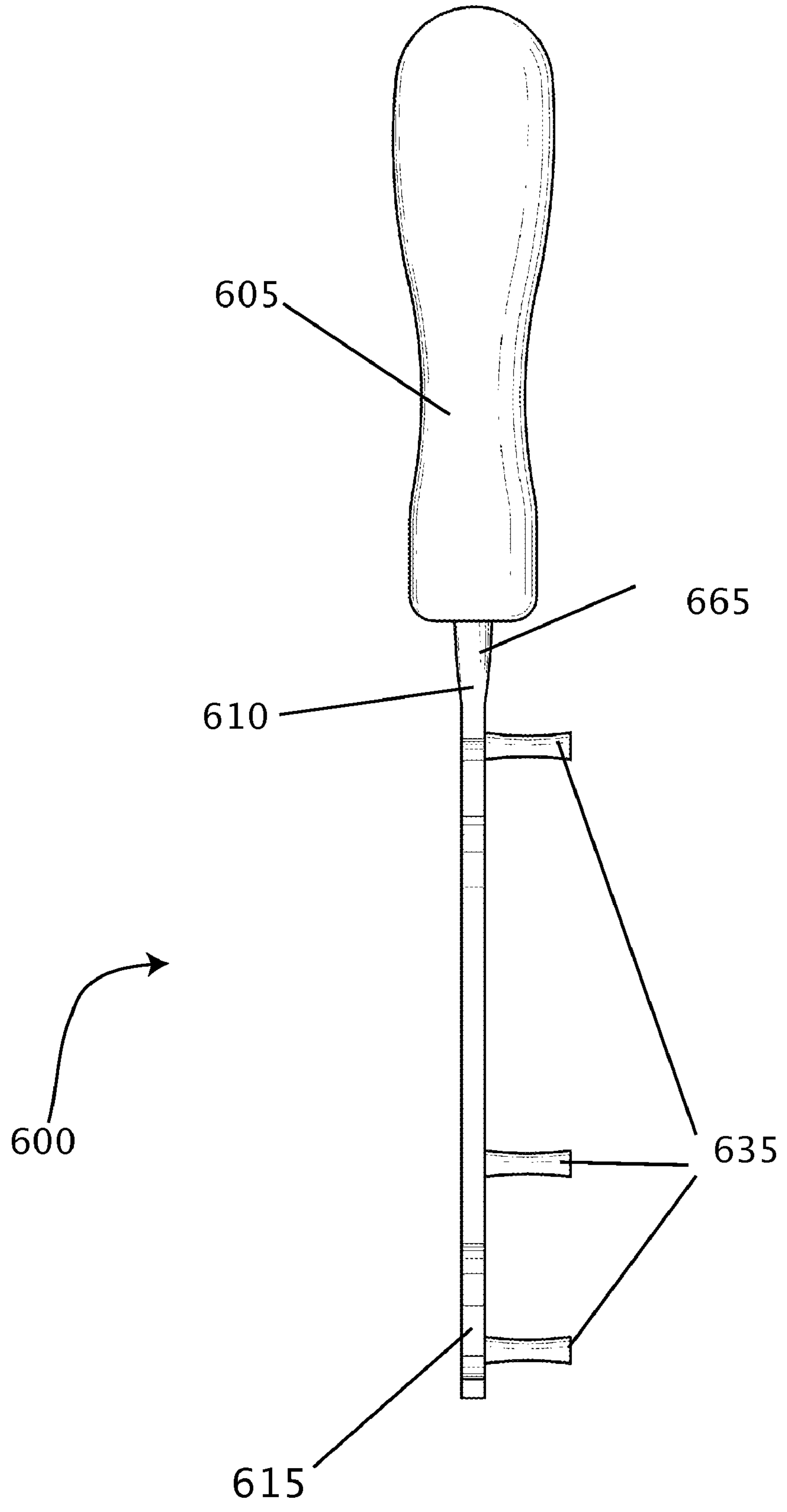
FIG. 6 is an illustration in side view of another embodiment of the present invention.

FIG. 6 is an illustration in perspective view of another embodiment of the present invention. A crucible holder 600 is shown with a handle 605, a neck 610, a ring 615, and three legs 635. Preferably the legs 635 extend just below the radius of the handle, but the legs can be shorter or longer without deviating from the scope of the invention. Preferably the legs 635 are removable and available in varying heights so the user can elevate crucible holder 600 to a range of desired heights. As shown in FIG. 6, the ring 615 of crucible holder 600 has is attached to the handle by extension 665. Preferably, handle 605 and extension 665 are threaded so that handle 605 is removable from ring 615 via unscrewing. When the handle 605 is removed, crucible holder 600 can act as a beaker stand, or can be transferred to an oven without damaging handle 605. For stability purposes extension 665 preferably extends into handle 605 at least one third the total length of the handle.

Figure 7:
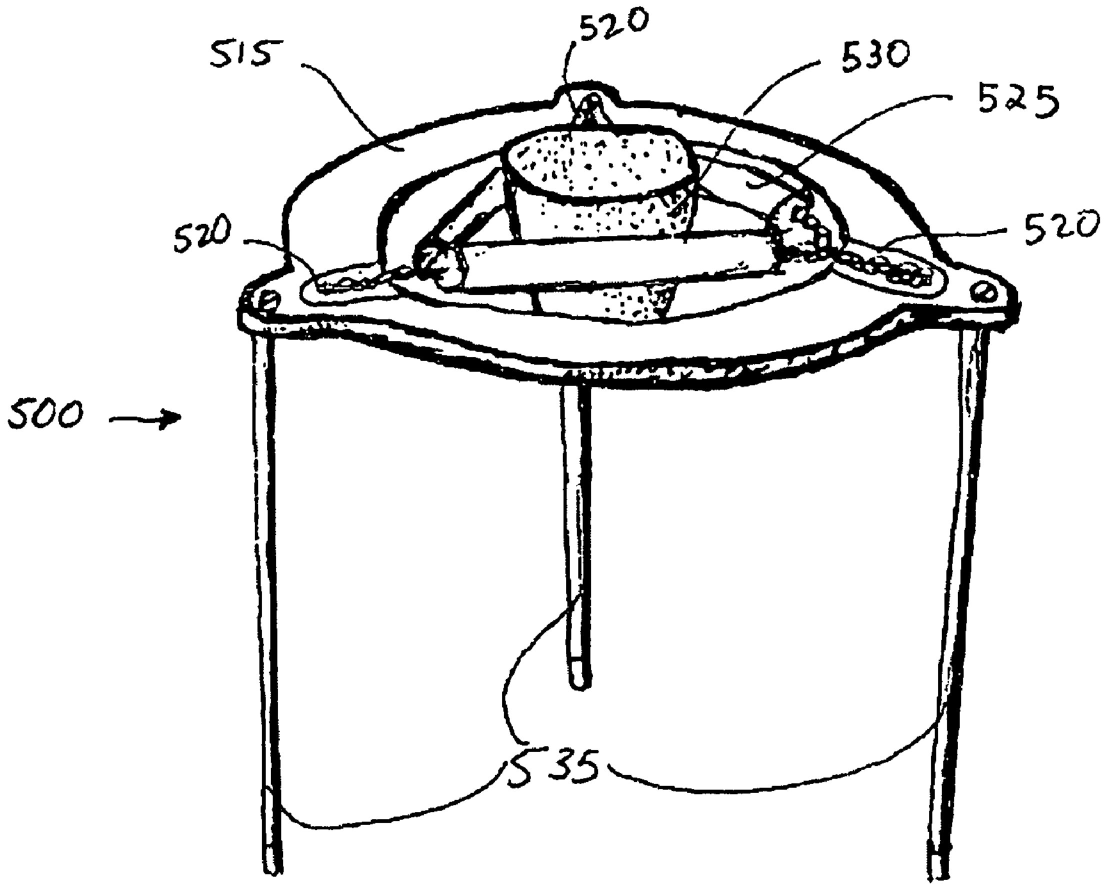
FIG. 7 is an illustration in perspective view of another embodiment of the present invention.

FIG. 7 is an illustration in perspective view of another embodiment of the present invention. A crucible holder 500 is shown while carrying a laboratory triangle 525 that holds a laboratory crucible 530. The constituent parts of the crucible holder 500 are shown, namely a ring 515, and groove shaped divots 520 for holding the laboratory triangle 525. The groove shaped divots 520 serve to securely hold the laboratory triangle 520 for transporting, placement on a scale, over a bunsen burner, or similar such laboratory uses. The crucible holder also includes three legs on its underside 535.

Figure 8:
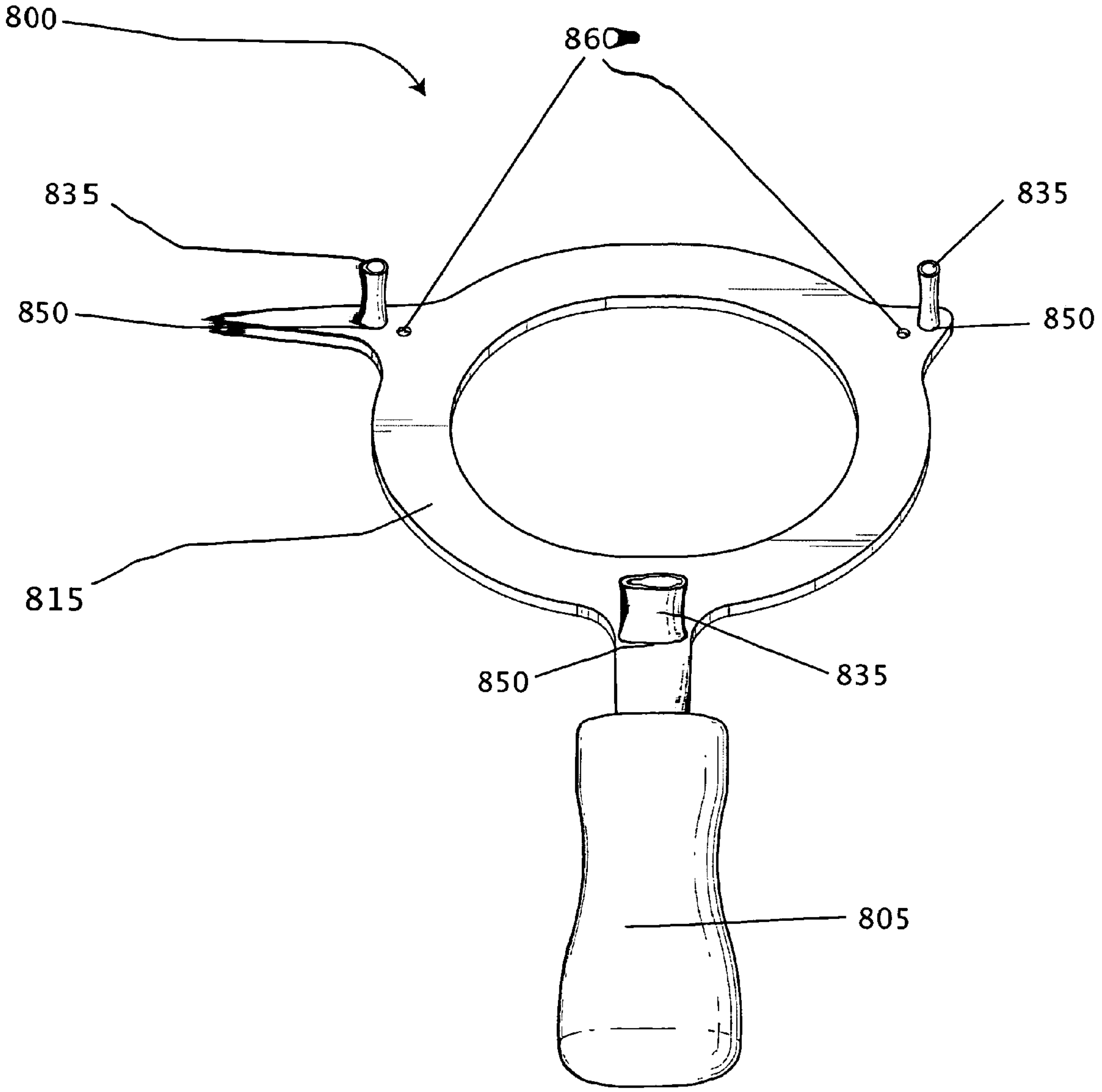
FIG. 8 is a bottom perspective view of another embodiment of the present invention.

FIG. 8 is a bottom perspective view of another embodiment of the present invention. In FIG. 8 crucible holder 800 is shown with a handle 805, a ring 815, legs 835, and inner holes 860. As shown in FIG. 8, legs 835 are engaged with outer holes 850 and extend perpendicularly away from the ring.

Figure 9:
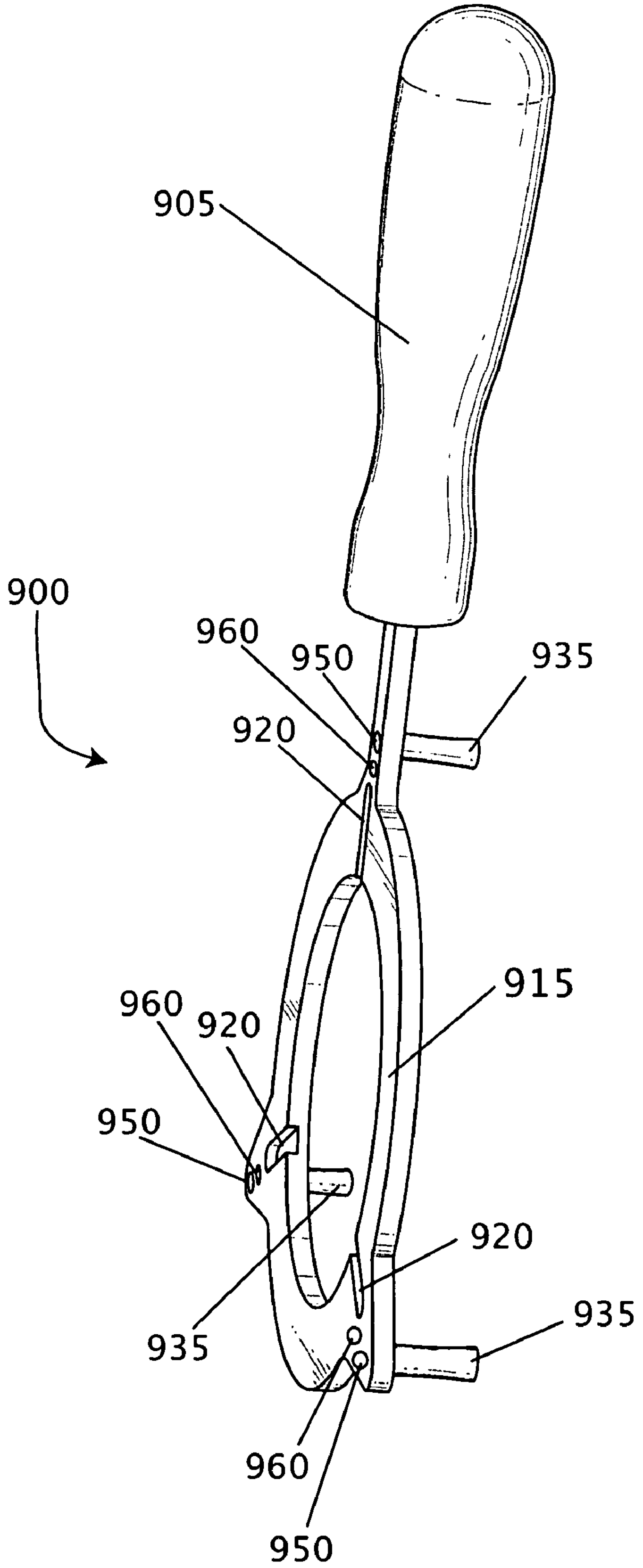
FIG. 9 is an illustration in perspective view of another embodiment of the present invention.

FIG. 9 is an illustration in perspective view of another embodiment of the present invention. In FIG. 9 crucible holder 900 is shown with a handle 905, a ring 915, legs 935, grooved shaped divots 920, outer holes 950, and inner holes 960.

I claim:

1. A labware holder, comprising;

a ring, said ring being generally circular in shape and featuring three trimetrically opposed groove shaped divots, and three legs on an underside, said groove shaped divots being shaped, positioned, and configured to removably hold a standard laboratory triangle, said legs, being configured as to stand a labware holder on a horizontal surface, wherein said standard laboratory triangle is held by said labware holder above said horizontal surface, a stem, and stem connecting said ring to a handle, said handle extending horizontally outwards from said ring and being configured to facilitate ease of handling of the labware holder, wherein said handle and said stem are threaded such that said handle is easily removable and re-attachable.

2. A labware holder as defined in claim 1 wherein said three legs are removable and re-attachable to said labware holder and said labware holder features one or more multiple attachment locations at varying distances from the center of said ring in order to attach said three legs to said labware holder;

wherein said laboratory holder is configured to be placed on a standard laboratory ring stand or a standard laboratory tripod such that said three legs of said laboratory holder surround said standard laboratory ring stand or said standard laboratory tripod to protect said laboratory holder from displacement from said standard laboratory ring stand or said standard laboratory tripod; and wherein said one or more multiple attachment locations allow a user to adjust a distance between said three legs to accommodate and surround different circumferences of said standard laboratory tripod and said standard laboratory ring stand.

* * * * *

UNITED STATES PATENT AND TRADEMARK OFFICE

CERTIFICATE OF CORRECTION

PATENT NO. : 7,628,433 B2
APPLICATION NO. : 11/097614
DATED : December 8, 2009
INVENTOR(S) : Arnold Schwartz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this

Second Day of November, 2010

David J. Kappos

*Director of the United States Patent and Trademark Office*